(12) United States Patent
Daniels, Jr.

(10) Patent No.: US 9,067,174 B2
(45) Date of Patent: Jun. 30, 2015

(54) SYSTEM AND METHOD FOR CONCENTRATING GAS

(71) Applicant: William J. Daniels, Jr., Wadsworth, OH (US)

(72) Inventor: William J. Daniels, Jr., Wadsworth, OH (US)

(73) Assignee: Invacare Corporation, Elyria, OH (US)

( * ) Notice: Subject to any disclaimer, the term of this patent is extended or adjusted under 35 U.S.C. 154(b) by 115 days.

(21) Appl. No.: 13/839,954

(22) Filed: Mar. 15, 2013

(65) Prior Publication Data
US 2013/0233169 A1    Sep. 12, 2013

Related U.S. Application Data

(63) Continuation-in-part of application No. 13/790,312, filed on Mar. 8, 2013, and a continuation-in-part of application No. 13/790,826, filed on Mar. 8, 2013, and a continuation-in-part of application No. 13/790,473, filed on Mar. 8, 2013.

(Continued)

(51) Int. Cl.
*B01D 53/04* (2006.01)
*B01D 53/30* (2006.01)

(52) U.S. Cl.
CPC ............ *B01D 53/30* (2013.01); *B01D 53/0454* (2013.01); *B01D 2256/12* (2013.01); *B01D 2259/4533* (2013.01); *B01D 2259/4541* (2013.01)

(58) Field of Classification Search
USPC .................. 95/8, 12, 14, 19, 22, 90, 96, 130; 96/109, 111, 112, 113, 121; 128/204.21, 205.27
See application file for complete search history.

(56) References Cited

U.S. PATENT DOCUMENTS

| 4,127,395 | A | 11/1978 | McKey et al. |
|---|---|---|---|
| 4,144,037 | A | 3/1979 | Armond et al. |
| 4,247,311 | A | 1/1981 | Seibert |
| 4,449,990 | A | 5/1984 | Tedford |
| 4,561,287 | A | 12/1985 | Rowland |

(Continued)

FOREIGN PATENT DOCUMENTS

| DE | 29605889 | 6/1996 |
|---|---|---|
| DE | 02007 021564 | 11/2008 |

(Continued)

OTHER PUBLICATIONS

International Search Report and Written Opinion from PCT/US07/18468 dated Feb. 11, 2008.

(Continued)

*Primary Examiner* — Frank Lawrence
(74) *Attorney, Agent, or Firm* — Calfee, Halter & Griswold LLP (57) ABSTRACT

A gas concentrating system is provided. The system includes, for example, a gas separation system having at least one separation space, at least one sensor connected to the separation space and providing at least one output signal indicative of the progress of gas separation, at least one pump system associated with gas separation system; and a controller. The controller includes, for example, logic reading the sensor output signal and logic controlling at least one parameter of the pump system based on the sensor output signal. The parameter of the pump system can be any parameter affecting the characteristics or operation of the pump system. Examples are disclosed but are not intended to be limiting.

20 Claims, 5 Drawing Sheets

Related U.S. Application Data (60) Provisional application No. 61/661,260, filed on Jun. 18, 2012, provisional application No. 61/750,517, filed on Jan. 9, 2013, provisional application No. 61/608,874, filed on Mar. 9, 2012.

(56) References Cited

U.S. PATENT DOCUMENTS

| | | | |
|---|---|---|---|
| 4,648,888 | A | 3/1987 | Rowland |
| 4,826,510 | A | 5/1989 | McCombs |
| 4,832,711 | A | 5/1989 | Christel, Jr. et al. |
| 4,932,402 | A | 6/1990 | Snook et al. |
| 4,971,609 | A | 11/1990 | Pawlos |
| 5,099,837 | A | 3/1992 | Russel et al. |
| 5,258,056 | A | 11/1993 | Shirley et al. |
| 5,474,595 | A | 12/1995 | McCombs |
| 5,593,478 | A * | 1/1997 | Hill et al. ............... 96/111 |
| 5,626,131 | A | 5/1997 | Chua et al. |
| 5,720,276 | A | 2/1998 | Kobatake et al. |
| 5,785,681 | A | 7/1998 | Indravudh |
| 5,906,672 | A | 5/1999 | Michaels et al. |
| 5,917,135 | A | 6/1999 | Michaels et al. |
| 5,988,165 | A | 11/1999 | Richey, II et al. |
| 6,051,051 | A | 4/2000 | Hees et al. |
| 6,106,245 | A | 8/2000 | Cabuz |
| 6,427,690 | B1 | 8/2002 | McCombs et al. |
| 6,517,610 | B1 | 2/2003 | De La Houssaye |
| 6,520,176 | B1 | 2/2003 | Dubois et al. |
| 6,561,187 | B2 | 5/2003 | Schmidt et al. |
| 6,629,525 | B2 | 10/2003 | Hill et al. |
| 6,651,658 | B1 | 11/2003 | Hill et al. |
| 6,691,702 | B2 | 2/2004 | Appel et al. |
| 6,764,534 | B2 | 7/2004 | McCombs et al. |
| 6,837,244 | B2 | 1/2005 | Yagi et al. |
| 6,878,186 | B2 | 4/2005 | Neary |
| 6,949,133 | B2 | 9/2005 | McCombs et al. |
| 6,962,654 | B2 * | 11/2005 | Arnaud ............... 210/143 |
| 7,294,170 | B2 | 11/2007 | Richey, II et al. |
| 7,306,657 | B2 | 12/2007 | Yagi et al. |
| 7,329,304 | B2 | 2/2008 | Bliss et al. |
| 7,393,382 | B2 | 7/2008 | Givens |
| 7,445,663 | B1 | 11/2008 | Hunter et al. |
| 7,455,717 | B2 | 11/2008 | Sprinkle |
| 7,604,005 | B2 | 10/2009 | Jagger et al. |
| 7,686,870 | B1 * | 3/2010 | Deane et al. ............... 96/115 |
| 7,722,700 | B2 | 5/2010 | Sprinkle |
| 7,766,010 | B2 * | 8/2010 | Jagger et al. ............. 128/202.21 |
| 7,875,105 | B2 | 1/2011 | Chambers et al. |
| 8,062,003 | B2 | 11/2011 | Goertzen et al. |
| 8,070,853 | B2 | 12/2011 | Sprinkle |
| 8,262,771 | B2 | 9/2012 | Seki et al. |
| 2002/0053286 | A1 | 5/2002 | Czabala |
| 2003/0180164 | A1 | 9/2003 | Bunner et al. |
| 2003/0215342 | A1 | 11/2003 | Higashino |
| 2003/0231967 | A1 | 12/2003 | Najafi et al. |
| 2004/0079359 | A1 | 4/2004 | Aylsworth et al. |
| 2006/0086251 | A1 | 4/2006 | Sprinkle |
| 2006/0174872 | A1 | 8/2006 | Jagger |
| 2008/0066616 | A1 | 3/2008 | Sprinkle |
| 2008/0257145 | A1 | 10/2008 | Sprinkle |
| 2009/0065526 | A1 | 3/2009 | Sprinkle |
| 2009/0211448 | A1 | 8/2009 | McClain |
| 2010/0071698 | A1 | 3/2010 | Kiritake |
| 2010/0095841 | A1 * | 4/2010 | Naheiri ............... 95/26 |
| 2010/0114218 | A1 * | 5/2010 | Heath ............... 607/5 |
| 2010/0242734 | A1 * | 9/2010 | Maeda et al. ............... 96/110 |
| 2011/0017216 | A1 | 1/2011 | Van Brunt et al. |
| 2011/0315140 | A1 | 12/2011 | Shuman |
| 2013/0233168 | A1 | 9/2013 | Richey, II |

FOREIGN PATENT DOCUMENTS

| | | |
|---|---|---|
| EP | 420620 | 4/1991 |
| EP | 1661596 | 5/2006 |
| GB | 1270296 | 4/1972 |
| WO | 98/56488 | 12/1998 |
| WO | 98/57165 | 12/1998 |
| WO | 2008/036159 | 3/2008 |
| WO | 2008/131338 | 10/2008 |
| WO | 2013/134645 | 9/2013 |

OTHER PUBLICATIONS

International Search Report and Written Opinion from PCT/US08/61022 dated Jul. 18, 2008.
International Search Report and Written Opinion from PCT/US13/029885 dated May 31, 2013.
Invacare Corporation, Oxygen Products Brochure, Form No. 05-054, 20 pages, copyright 2005.
Invacare Corporation, Oxygen Products Brochure, Form. No. 05-054, 16 pgs., copyright 2008.
Invacare Corp., XP02 Portable Concentrator, Invacare Product Catalog, www.invacare.com/cgi-bin/imhqprd/inv_catalog/prod_cat_detail.jsp?s=0 & prodID=XPO100 & catOID=-536885301, printed Mar. 17, 2008, 1 pg.
Office action from U.S. Appl. No. 11/258,480 dated Feb. 12, 2008.
Response to Office action from U.S. Appl. No. 11/258,480 dated May 9, 2008.
Notice of Allowance from U.S. Appl. No. 11/258,480 dated Jul. 21, 2008.
Office action from U.S. Appl. No. 11/522,683 dated Jun. 8, 2009.
Response to Office action from U.S. Appl. No. 11/522,683 dated Dec. 8, 2009.
Notice of Allowance from U.S. Appl. No. 11/522,683 dated Dec. 30, 2009.
Office action from U.S. Appl. No. 12/106,861 dated Jul. 21, 2010.
Response from U.S. Appl. No. 12/106,861 dated Oct. 21, 2010.
Office action from U.S. Appl. No. 12/106,861 dated Dec. 7, 2010.
Response from U.S. Appl. No. 12/106,861 dated Apr. 6, 2011.
Office Action from U.S. Appl. No. 12/106,861 dated Jun. 14, 2012.
Amendment from U.S. Appl. No. 12/106,861 dated Oct. 15, 2012.
Final Office Action from U.S. Appl. No. 12/106,861 dated Oct. 23, 2012.
Amendment with RCE from U.S. Appl. No. 12/106,861 dated Jan. 23, 2013.
Notice of Allowance for U.S. Appl. No. 12/106,861 dated Jun. 12, 2013.
Office Action from U.S. Appl. No. 12/274,026 dated Nov. 8, 2010.
Amendment with Terminal Disclaimer from U.S. Appl. No. 12/274,026 dated Mar. 8, 2011.
Notice of Allowance from U.S. Appl. No. 12/274,026 dated May 11, 2011.
Notice of Allowance from U.S. Appl. No. 12/274,026 dated Sep. 28, 2011.
Office Action from U.S. Appl. No. 13/790,826 dated Sep. 9, 2014.
Response to Office Action from U.S. Appl. No. 13/790,826 dated Dec. 9, 2014.
Office Action from U.S. Appl. No. 13/790,473 dated Sep. 9, 2014.
Response to Office Action from U.S. Appl. No. 13/790,473 dated Dec. 9, 2014.
Partial International Search Report from PCT/US13/46086 dated Sep. 23, 2013.
International Search Report from PCT/US13/46086 dated Dec. 12, 2013.
International Search Report and Written Opinion from PCT/US14/10409 dated Jun. 12, 2014.
Examination Report from AU Application No. 2007297814 dated Feb. 4, 2010.
Response from Australian Application No. 2007297814 dated Apr. 4, 2011.
Office action from Australian Application No. 2008242596 dated Jul. 14, 2010.
Further Examination Report from Australian Application No. 2008242596 dated Oct. 7, 2011.
Response to Examiner's Second Report from Australian Application No. 2008242596 dated Feb. 8, 2012.
First Office Action in AU Patent Application No. 2012203342 dated Dec. 21, 2012.

(56) References Cited

OTHER PUBLICATIONS

Office action from Canadian Application No. 2,663,902 dated Oct. 20, 2010.
Response to Office Action from Canadian Application No. 2,663,902 dated Apr. 20, 2011.
Office action from Canadian Application No. 2,684,871 dated May 31, 2011.
Response to Office Action from Canadian Application No. 2,684,871 dated Nov. 30, 2011.
First Office Action in Canadian Application No. 2,793,228 dated Jan. 8, 2013.
Response from Canadian Application No. 2,793,228 dated Jun. 17, 2013.
Second Office Action from Canadian Application No. 2,793,228 dated Jul. 29, 2013.
Response to Office Action from Canadian Application No. 2,793,228 dated Jan. 29, 2014.
Communication from EP Application No. 07837126.7 dated Sep. 3, 2010.
Response from EP Application No. 07837126.7 dated Mar. 14, 2011.
Exam Report from EP Application No. 07837126.7 dated Sep. 27, 2011.
Response from EP Application No. 07837126.7 dated Mar. 16, 2012.
Search Report from EP Application No. 08746446.7 dated Aug. 2, 2011.
Response from EP Application No. 08746446.7 dated Feb. 3, 2012.
Office Action from EP Application No. 08746446.7 dated Jun. 27, 2012.
Response to Communication from EP Application No. 08746446.7 dated Dec. 27, 2012.
Response to OA requesting claims in EP Application No. 12184137.3 dated Dec. 4, 2012.
Extended EP Search Report for EP Application No. 12184137.3 dated Feb. 14, 2013.
Response from European Application No. 12184137.3 dated Aug. 27, 2013.
Office action from European Application No. 12184137.7 dated Oct. 1, 2013.
Response from European Application No. 12184137.7 dated Apr. 11, 2014.
Communication to Rules 161(1) and 162 EPC from European Application No. 137107464.5 dated Nov. 7, 2014.
Examination Report from New Zealand Application No. 575,059 dated Dec. 15, 2010.
Response to New Zealand Application No. 575,059 dated May 8, 2012.
Office Action from New Zealand Application No. 575,059 dated May 22, 2012.
Response to Office Action from New Zealand Application No. 575,059 dated Jun. 28, 2012.
First Examination Report from New Zealand Application No. 580,515 dated Mar. 23, 2011.
Examination Report from New Zealand Application No. 580,515 dated Aug. 14, 2012.
Response to First Examination Report from New Zealand Application No. 580,515 dated Jul. 23, 2012.
Response to Second Examination Report from New Zealand Application No. 580,515 dated Oct. 18, 2012.
Third Examination Report from New Zealand Application No. 580,515 dated Nov. 9, 2012.
Response to Third Examination Report from New Zealand Application No. 580,515 dated Nov. 15, 2012.
Office action from New Zealand Application No. 603120 dated Oct. 26, 2012.
Response from New Zealand Application No. 603120 dated Dec. 23, 2013.
First Examination Report from New Zealand Application No. 619,142 dated Jan. 29, 2014.
Office Action from Chinese Application No. 200780034658.2 dated Nov. 14, 2011.
Response to Office Action from Chinese Application No. 200780034658.2 dated May 4, 2012.
Office action from Chinese Application No. 200780034658.2 dated Aug. 1, 2012.
Third Office Action from Chinese Application No. 200780034658.2 dated Jan. 21, 2013.
Response to Third Office Action from Chinese Application No. 200780034658.2 dated Jun. 5, 2013.
Office action from Chinese Application No. 200780034658.2 dated Jun. 19, 2013.
Response from Chinese Application No. 200780034658.2 dated Nov. 4, 2013.
Office Action from Chinese Application No. 200880021148.6 dated Nov. 1, 2011.
Response to Office Action from Chinese Application No. 200880021148.6 dated May 13, 2012.
Second Office Action from Chinese Application No. 200880021148.6 dated Oct. 25, 2012.
Response from Chinese Application No. 200880021148.6 dated Mar. 8, 2013.
Third Office Action from Chinese Application No. 200880021148.6 dated May 2, 2013.
Response from Chinese Application No. 200880021148.6 dated Jul. 17, 2013.
First Office Action in Colombian Application No. 09028163 dated Aug. 22, 2012.
International Preliminary Report on Patentability from PCT/US13/046086 dated Dec. 23, 2014.
Notice of Allowance from U.S. Appl. No. 13/790,826 dated Jan. 22, 2015.
Notice of Allowance from U.S. Appl. No. 13/790,473 dated Jan. 12, 2015.
Response from Australian Application No. 2008242596 dated Sep. 26, 2011.
Notice of Grant of EP Application No. 07837126.7 dated Jul. 8, 2013.
Response from Colombian Application No. 09028163 dated Nov. 6, 2012.

* cited by examiner

SYSTEM AND METHOD FOR CONCENTRATING GAS

PRIORITY

This application claims priority to provisional U.S. Pat. app. Ser. Nos. 61/661,260 filed Jun. 18, 2012 and 61/750,517 filed Jan. 9, 2013.

This application is also a continuation in part of U.S. patent application Ser. Nos.:

Ser. No. 13/790,312 filed Mar. 8, 2013 (which claims priority to 61/661,260),

Ser. No. 13/790,826 filed Mar. 8, 2013 (which claims priority to 61/608,874),

Ser. No. 13/790,473 filed Mar. 8, 2013 (which claims priority to 61/750,517).

All of the aforementioned applications are incorporated by reference herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND

Various applications exist for the separation of gaseous mixtures. For example, the separation of nitrogen from atmospheric air can provide a highly concentrated source of oxygen. These various applications include the provision of elevated concentrations of oxygen for medical patients and flight personnel. Hence, it is desirable to provide systems that separate gaseous mixtures to provide a concentrated product gas, such as a breathing gas with a concentration of oxygen.

Several existing product gas or oxygen concentrating systems and methods, for example, are disclosed in U.S. Pat. Nos. 4,449,990, 5,906,672, 5,917,135, 5,988,165, 7,294,170, 7,455,717, 7,722,700, 7,875,105, 8,062,003, 8,070,853 and U.S. Pat. Publication No. 2008/0257145 which are commonly assigned to Invacare Corporation of Elyria, Ohio and fully incorporated herein by reference.

SUMMARY

In one embodiment, a gas concentrating system is provided. The system includes, for example, a gas separation system having at least one separation space, at least one sensor connected to the separation space and providing at least one output signal indicative of the progress of gas separation, at least one pump system associated with gas separation system; and a controller. The controller includes, for example, logic reading the sensor output signal and logic controlling at least one parameter of the pump system based on the sensor output signal. The parameter of the pump system can be any parameter affecting the characteristics or operation of the pump system. Examples are disclosed but are not intended to be limiting.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DESCRIPTION

As described herein, when one or more components are described or shown as being connected, joined, affixed, coupled, attached, or otherwise interconnected, such interconnection may be direct as between the components or may be in direct such as through the use of one or more intermediary components. Also as described herein, reference to a member, component, or portion shall not be limited to a single structural member, component, element, or portion but can include an assembly of components, members, elements, or portions.

Figure 1A:
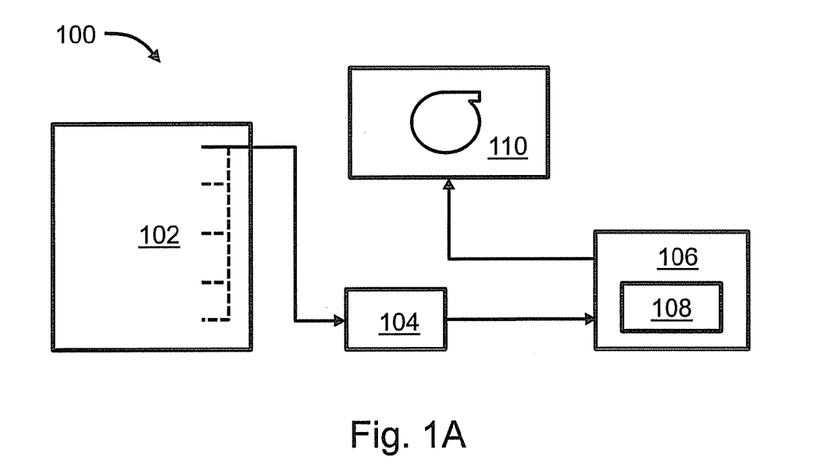
FIG. 1A is a block diagram of one embodiment of a gas concentrating system.

Illustrated in FIG. 1A is one embodiment of an oxygen concentrating system 100. The system may be stationary such as, for example, for use in a hospital or a patient's home. The system can also be ambulatory or mobile such as, for example, for use by a patient when they are away from home. The system can be configured in a manner so as to allow the patient to carry system such as, for example, through an over the shoulder strap or through an arrangement whereby the system includes a handle and wheels. Other mobility configurations are also included.

System 100 includes a gas separation system 102, one or more sensors 104, a pump means or system 110, and a controller or control means 106. The controller 106 reads and processes signals from the one or more sensors 104 and uses logic 108 to control various devices and/or parameters of the system. Gas separation system 102 may include any number of means for separating a mixture of gases into one or more components. One suitable means includes, for example, one or more molecular sieve beds. Other means can include one or more membrane-based separation media. Separation system 102 includes a separation space or volume that can include a molecular sieve material for separating e.g., oxygen from atmospheric air. The molecular sieve material acts as an adsorbent blocking certain gaseous molecules while allowing others to pass. Zeolite materials are commonly used as adsorbents for molecular sieve materials. Other materials can also be used. The separation space or volume is typically cylindrical in nature, but can take other forms as well. Additionally, separation system may be based on vacuum swing adsorption, pressure swing adsorption, and combinations thereof as generally known to those skilled in the art. Examples of separation systems are disclosed in U.S. patent application Ser. No. 13/790,473, filed Mar. 8, 2013 and incorporated by reference herein.

Sensor(s) 104 are associated with gas separation system 102. In one embodiment, sensor(s) 104 are connected to the separation space or volume. In this configuration, one or more sensors 104 can monitor the progress of the gas separation in the separation space or volume. This monitoring can be done at one or more locations, as represented by the dashed line in gas separation system 102. U.S. patent application Ser. No. 13/790,826 filed Mar. 8, 2013 describes several sensing arrangement and is hereby incorporated by reference. As the gas mixture is introduced into the separation space or volume, an adsorption zone of finite, relatively large size is formed. This adsorption zone is a region of the separation space or volume in which the full capacity of the adsorbent material to hold the adsorbable components has not been reached. The composition of the gas in the voids of the zeolite varies from substantially pure primary-product gas at the outlet end, to the ambient gaseous mixture composition at the inlet end. Sensor(s) 104 can sense the composition, concentration, pressure, temperature, flow or other characteristics of the gas at one or more locations within the separation space or volume. Any of these characteristics or combinations of characteristics may be indicative of the progress of gas separation.

This adsorption zone moves from the inlet of the separation space or volume toward the outlet with a velocity significantly less than the superficial gas velocity in the bed. By sensing the characteristic of the gas at one or more locations inside the separation space or volume, sensor(s) 104 can provide data indicating the movement or progress of the adsorption zone within the separation space or volume. When the adsorption zone reaches the outlet of the separation space or volume, adsorbable components begin to flow through the outlet into the nonadsorbable primary product stream. The time at which this occurs is hereinafter referred to as "breakthrough" and can be sensed or anticipated by sensor(s) 104. For a given gaseous composition, the breakthrough is defined by the size and configuration of the separation space or volume as well as the packing configuration of the molecular sieve and the flow rate and bed gas pressure. In one embodiment, separation space or volume is generally cylindrical, while the output volume rate can vary from about 0 to 6 liters per minute, and more specifically 3, 5, and 6 liters, respectively. The breakthrough is the time required for the diffusion reaction as nitrogen saturates and is weakly bonded to the separation media.

In one embodiment, sensor(s) 104 sense the concentration of nitrogen gas as the adsorption zone moves through the separation space or volume. The concentration of nitrogen ahead of the adsorption zone will be low (to nonexistent), whereas the concentration of nitrogen behind the adsorption zone will be high due to it being the absorbable component of the gas. In alternative embodiments, the concentration of other gases can also be sensed including, for example, oxygen where it is the absorbable component. Hence in one embodiment, the absorbable component of the gas mixture can be monitored by sensor(s) 104 at one or more locations in the separation space or volume. Other parameters can also be sensed including the temperature, pressure, and flow associated with portions of the separation space or volume.

There are several locations at which sensor(s) 104 can monitor the separation space or volume. In one embodiment, sensor(s) 104 can be connected to the separation space or volume along the direction of its axial length. For example, if the separation space or volume is generally in the form of a cylinder, a sensor 104 can be connected near the top or outlet of the cylinder, either at the top wall of the cylinder or a top portion of the side wall of the cylinder. In another embodiment, a second sensor can be connected near a middle portion of the cylinder such as through a middle portion of its sidewall. In yet another embodiment, the third sensor can be connected to a lower or inlet portion of the cylinder such as through a bottom wall of the cylinder or a bottom portion of the side wall of the cylinder. Additional sensors may be disposed anywhere between the aforementioned sensors as well. In yet another embodiment, sensor 104 can be connected to the output of the separation space or volume. In this manner, sensor(s) 104 can monitor the progress of gas separation inside the separation space or volume. Sensor(s) 104 can also be used to monitor regeneration, desorption or purging of the separation space or volume as typically occurs pressure, vacuum or pressure-vacuum swing adsorption cycles. In such a case, sensor(s) can monitor the progress of, e.g., nitrogen removal from the separation space or volume and use that information as feedback to control the pneumatic components of the system. This is akin to monitoring the reverse of a breakthrough, where nitrogen is purged from the system.

Controller 106 reads and processes data or information received from sensor(s) 104 to control or adjust one or more devices or parameters of the gas separation system 100. Controller 106 can be microprocessor-based and includes one or more memories for storing control logic 108. Control logic 108 contains instructions to be executed by controller 106 that, for example, determine the progress of gas separation and adjust one or more devices or parameters of the separation system based on that information.

In one embodiment, controller 106 and control logic 108 control the operational parameters of pump system 110. Pump system 110 is typically responsible for controlling the pressure and flow rates of the various gases affected by separation system 102. For example, in a pressure swing or vacuum swing absorption system, pump system 110 functions to provide the working pressures (positive or negative) that transport gases into and out of separation system 102.

Figure 1B:
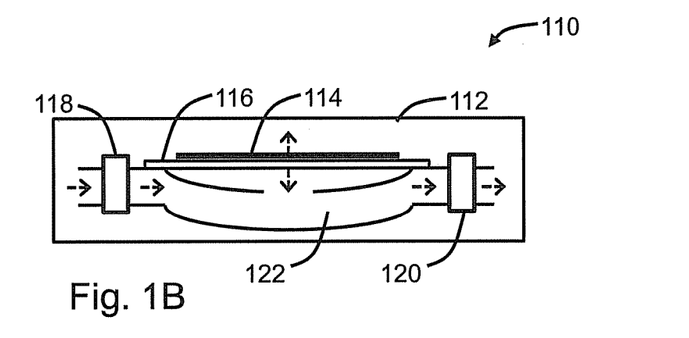
FIG. 1B is a block diagram of one embodiment of a micro-pump or pump system.

FIG. 1B illustrates one example of a pump system 110 having a micro-pump component 112 having a piezoceramic disk 114 attached to a membrane or diaphragm 116 that is capable of moving at various frequencies in response to an alternating applied voltage. In various embodiments, for example, the frequency range may be up to about 1 kHz, from about 1 kHz to several 10 kHz, or from several 10 kHz and higher. The disk-shaped piezo element 114 can be mounted directly on the pump diaphragm 116 to deflect the pump diaphragm 116 during each voltage cycle, creating pumping action that includes associated vacuums and pressures. For example, in operation, as the applied voltage on the disk-shaped piezo element 114 causes the pump diaphragm 116 to deflect up, gas can be drawn into a pump chamber 122 of the micro-pump 112 through valve 118. As the applied voltage on the disk-shaped piezo element 114 cycles, causing the pump diaphragm 116 to deflect down, gas can be pushed out of the pump chamber 122 and the micro-pump 112 through valve 120. Valves 118, 120 may be check valves or valves controlled by a control system. Further examples of pump systems are disclosed in U.S. Pat. App. Ser. No. 61/661,260 filed Jun. 18, 2012 and Ser. No. 13/790,312 filed Mar. 8, 2013, which are incorporated by reference.

In this manner, one or more micro-pumps 112 can be used with one another to create a range of vacuums or pressures in various series or parallel configurations. In some embodiments, individual micro-pumps 112 can be different from each other and may have different specifications and operating characteristics. For example, a plurality of micro-pumps 112 can be arranged in a series configuration such that the output of one micro-pump is coupled to the input of another micro-pump. In this manner, the micro-pump assembly can yield a pressure or vacuum that is an additive combination of the individual pressures or vacuums associated with each micro-pump. In another exemplary embodiment, a plurality of micro-pumps 112 can be arranged in a parallel configuration such that the outputs and inputs of the micro-pumps are coupled together. In this manner, the micro-pump assembly can yield a pressure, vacuum, and/or flow rate that is an additive combination of the individual pressure, vacuum, and/or flow rates associated with each micro-pump. In yet another exemplary embodiment, a plurality of micro-pumps can be arranged in a combination series and parallel configuration. In this manner, the micro-pump assembly can yield a pressure, vacuum, and/or flow rate that is an additive combination of the individual pressure, vacuum, and/or flow rates associated with groups of micro-pumps.

Hence, any number of micro-pumps can be coupled together in a micro-pump assembly using various series and/or parallel configurations to produce a wide range of pressures, vacuums, and/or flow rates. For example, an individual micro-pump or a plurality of micro-pump assemblies may be used as the as pressure system 110.

Figure 2:
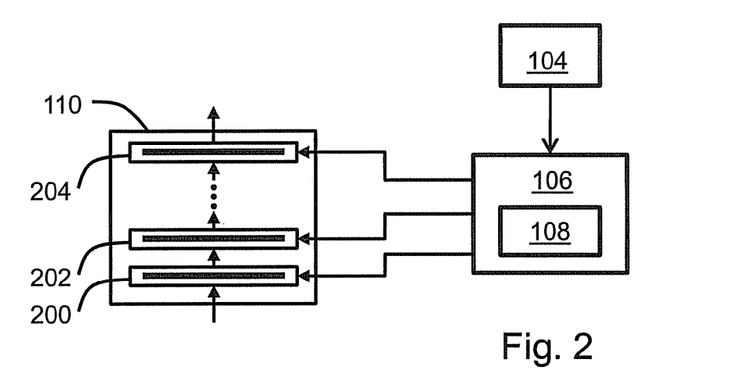
FIG. 2 is a block diagram of another embodiment of a pump system associated with a gas concentrating system.

FIG. 2 illustrates one embodiment of a pump system 110 associated with a gas concentrating system. Pump system 110 can include one or more micro-pumps 200, 202 and 204. Any number of micro-pumps can be included based on system requirements. In one embodiment, a micro-pump can include a piezo-driven membrane or micro-diaphragm as its force component. The micro-pumps can be configured to output a positive pressure or negative pressure (e.g., vacuum), as required by the system design (e.g., vacuum swing adsorption, pressure swing adsorption, etc.) Further examples of micro-pumps and separation systems are disclosed in U.S. Pat. app. Ser. Nos. 61/661,260, 13/790,312, 61/750,517 and 13/790,473, which are hereby incorporated by reference.

The pump system 110 of FIG. 2 shows a plurality of micro-pumps 200-204 in a series configuration. In an alternate embodiment, the micro-pumps 200-204 can be in a parallel configuration. In the configuration shown in FIG. 2, each micro-pump is individually controllable by controller 106 and control logic 108 based on data or information from sensor(s) 104. Controller 106 can control one or more parameters of each micro-pump including, for example, on/off state, frequency of operation, output pressure or vacuum level, energy consumption, and flow rate.

Figure 3:
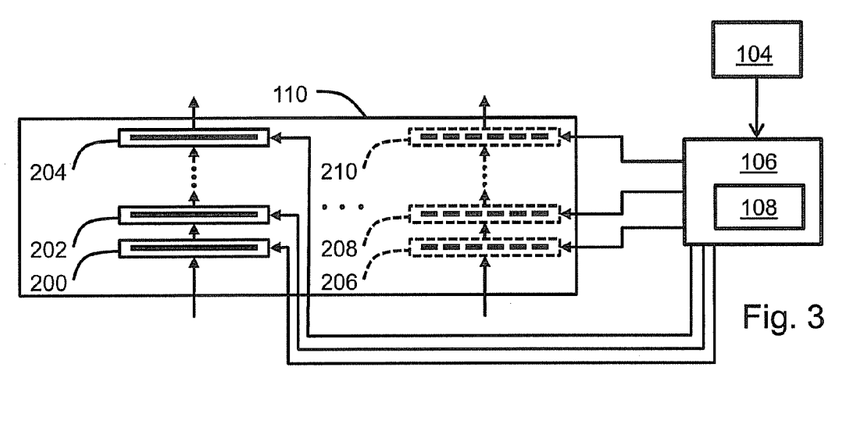
FIG. 3 is a block diagram of another embodiment of a pump system associated with a gas concentrating system.

FIG. 3 illustrates another embodiment of pump system 110 where there are parallel banks of micro-pumps. Each bank can include one or more micro-pumps in series configuration. For example, the first bank includes micro-pumps 200-204 and a second bank includes micro-pumps 206-210. While only two banks of micro-pumps are illustrated, it should be clear that any number of banks can be included and that within each bank any number of micro-pumps can be present. In this configuration, controller 106 and logic 108 can control each individual micro-pump, as described above.

Figure 4:
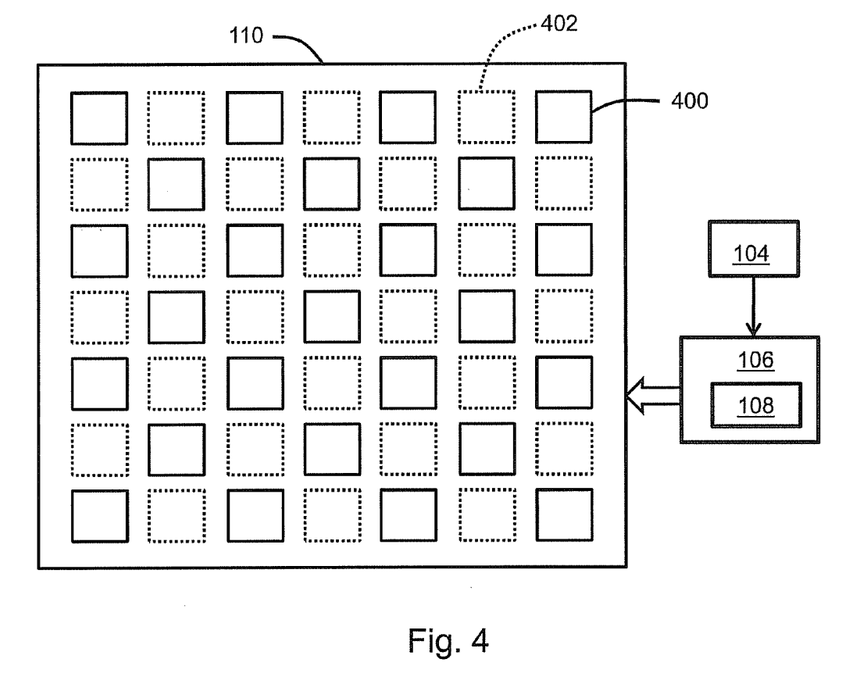
FIG. 4 is a block diagram of another embodiment of a pump system associated with a gas concentrating system more or less than all of the pumps are active.
Figure 5:
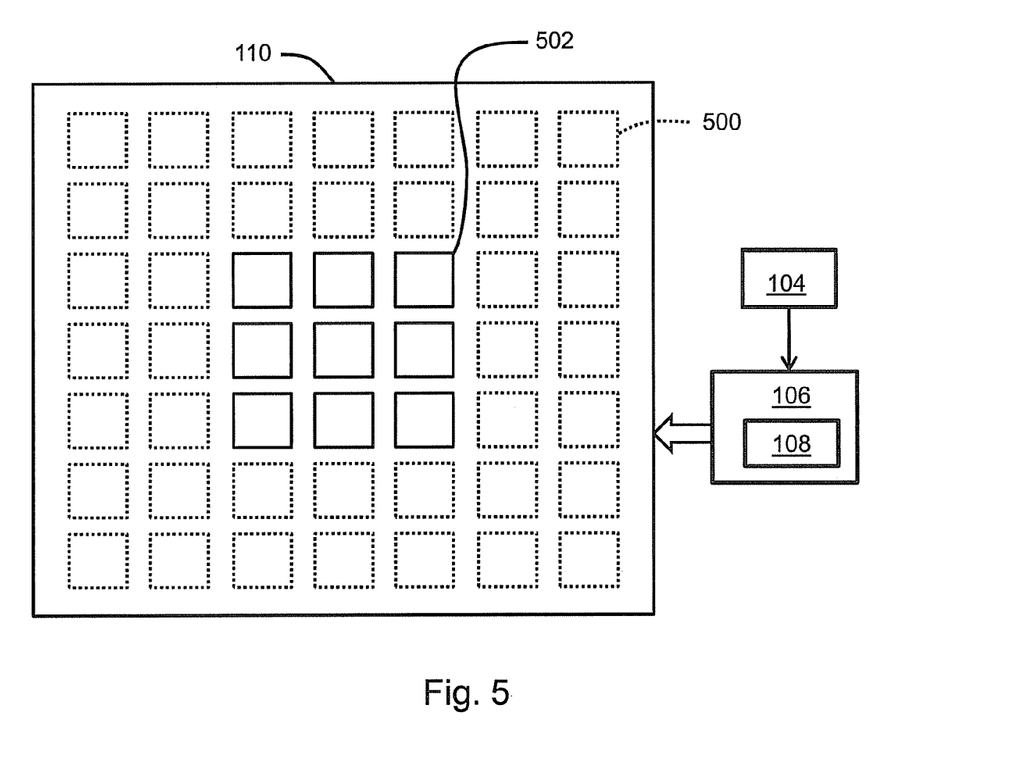
FIG. 5 is a block diagram of yet another embodiment of a pump system associated with a gas concentrating system were less than all of the pumps are active.

FIG. 4 illustrates another embodiment of pump system 110 having a plurality of micro-pumps in an array-like configuration. Micro-pumps 400 and 402 have been identified by way of example. In this embodiment, the plurality of micro-pumps are distributed in a rectangular array. Controller 106 and logic 108 are connected to control the operating parameters of each individual micro-pump based on the information provided by sensor(s) 104. In this embodiment, every other micro-pump is active or on, as indicated by solid lines as shown by way of example by micro-pump 400. The dotted micro-pumps, as shown by way of example by micro-pump 402, are not active or off. FIG. 5 illustrates an embodiment of pump system 110 where only the center portion micro-pumps 502 are active or on. The surrounding micro-pumps 500 are in active or off. Controller 106 and logic 108 are configured to control each individual micro-pump in the plurality so that any appropriate pattern of active or inactive micro-pumps can be generated. Also as described above, controller 106 and logic 108 can control one or more parameters of each individual micro-pump in the plurality to generate a variety of conditions in separation system 102.

Figure 6:
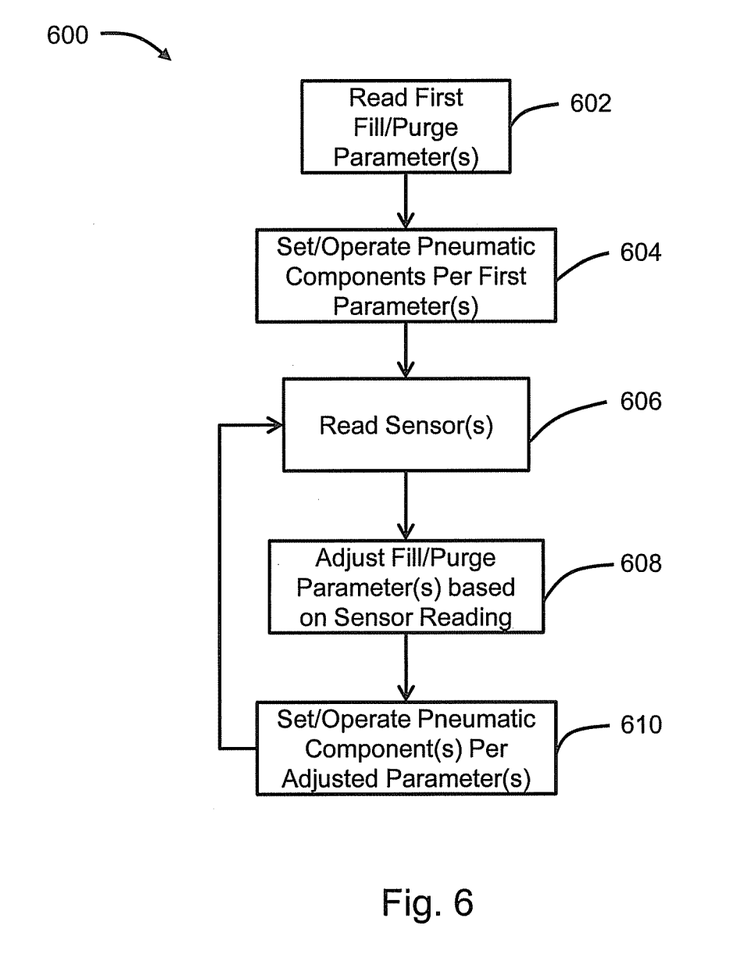
FIG. 6 is a flowchart of one embodiment of control logic associated with a gas concentrating system.

Referring now to FIG. 6, one embodiment of a flow chart 600 for a gas concentrating system is illustrated. The rectangular elements denote processing blocks and represent computer software instructions or groups of instructions. The diamond elements represent decision processing blocks and computer software instructions or groups of instructions. The flow diagram(s) shown and described herein do not depict syntax of any particular programming language. Rather, the flow diagram(s) illustrate the functional information that may be used to fabricate circuits or to generate computer software to perform the processing of the system. It should be noted that many routine program elements, such as initialization of loops and variables and the use of temporary variables are not shown. Furthermore, the exact order of the process steps need not necessarily be performed in the order shown or described herein and may be modified.

In block 602, the control logic reads a first set of parameters associated with the control of the gas concentrating system. These parameters can be read from a memory associated with controller 106. The parameters can include, for example, all the operational settings for the pneumatic components of the gas concentrating system such as, for example, pump system 100 and separation system 102 components (e.g., crossover valving means, concentration equalization devices and other controllable devices such as motors and valves.) The data may include timing, sequence, pressure, oxygen concentration, nitrogen concentration, temperature and other process or flow settings and subsets of the foregoing. In block 604, the logic operates the pneumatic components of the gas concentrating system according to the first set of parameters in order to produce concentrated gas product.

In block 606, a sensing device or means (such as sensor(s) 104) are read by controller 106. As described above, sensor(s) 104 provide information indicative of the progress of an absorption zone in the separation space or volume. In one example, sensor(s) 104 monitor to determine when the adsorption zone will reach the outlet or an area proximate to the outlet of the separation space or volume. In this situation, sensor(s) 104 will indicate a change in their reading to indicate, for example, the adsorption zone has reached the outlet of the separation space or volume thereby producing an increased level of nitrogen concentration measured at that outlet. The timing of such an event is used in block 608 to adjust one or more of the gas concentrating system control parameters such as, for example, the opening and closing of valves associated with the separation system and/or one or more parameters of pump system 110 including, for example, individual or groups of micro-pumps. Adjusting one or more of these parameters can result in a more efficient production of product gas from the system. It can also result in a more efficient regeneration or purging of the separation space or volume.

In block 610, the adjusted control parameters are stored in memory and used to operate the system's pneumatic components. The logic then loops back to block 606 to once again read the output of sensing device(s) or means. As described above, the logic may loop back to block 606 after each fill/purge cycle, or after a designated plurality of fill/purge cycles of the separation system. In this manner, the gas concentrating system adjusts its operating parameters based on the absorption process that is going on in the separation system. This adjustment can include changing the state of the valves and pumps within gas separation system to initiate a purge cycle, fill cycle, pressure equalization step, concentration equalization step, etc. It can also include adjusting the operational state of one of more valves and pumps. Valve positions may be adjusted to be more open or closed. Pumps can be adjusted to provide more or less pressure or flow. Furthermore, as described above, the number of active pumps can be adjusted, along with their pressure and flow outputs. Still further, the timing cycles of the pumps and valves can be adjusted by, for example, advancing or delaying their timing, or by changing their cycle durations.

Figure 7:
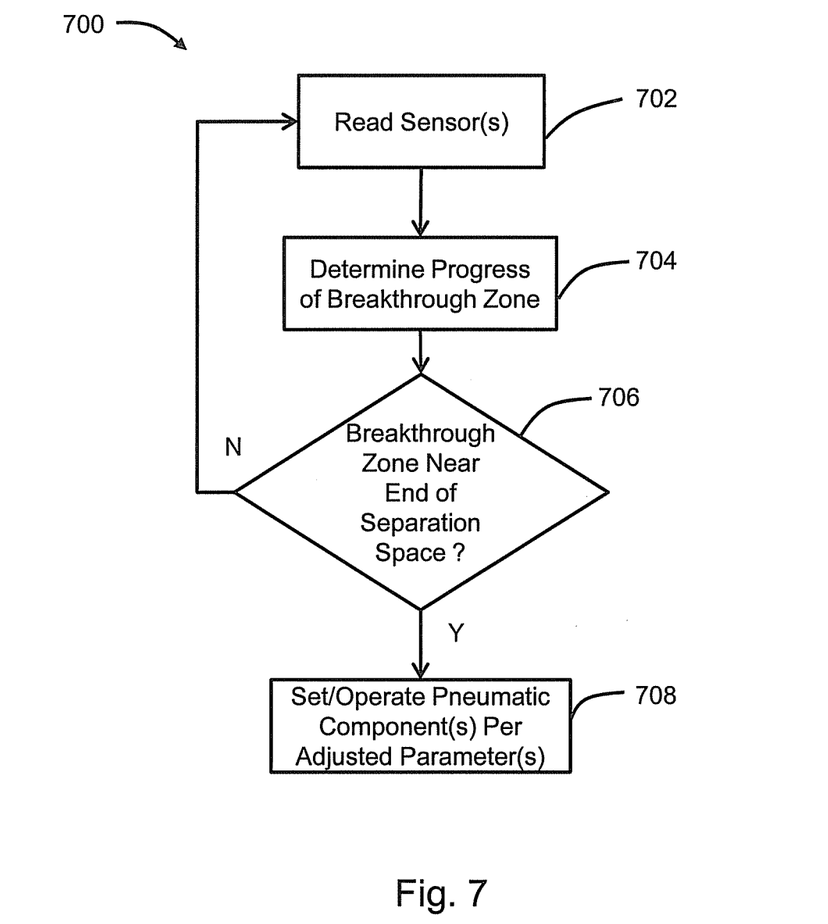
FIG. 7 is a flowchart of another embodiment of control logic associated with a gas concentrating system.

FIG. 7 illustrates another embodiment of a logic flow diagram for controlling gas separation. In block 702, the logic reads the sensing devices (e.g., sensor(s) 104) output signal. In block 704 the logic determines the progress of the gas separation by determining the progress of the adsorption zone. As described earlier, in one embodiment, this zone is represented by progress of an adsorbed component such as Nitrogen being increasingly adsorbed by the gas separation system. Since sensor(s) 104 can be located at one or more locations within the gas separation system, logic 700 can determine the physical progress of the nitrogen adsorption zone as it travels. In block 706, the logic determines if the adsorption zone is near the end of the separation space (e.g., or approaching breakthrough). This is done by reading the output of a sensor 104 that is proximate the end or output of the separation space. In block 708, logic 700 adjusts the operating parameters of the pneumatic components. These adjustments include the same adjustments described in connection with block 610 of FIG. 6 and elsewhere herein.

The control or flow logic shown and described herein preferably resides in or on a computer readable medium such as, for example, a Read-Only Memory (ROM), Random-Access Memory (RAM), programmable read-only memory (PROM), electrically programmable read-only memory (EPROM), electrically erasable programmable read-only memory (EEPROM), magnetic disk or tape, and optically readable mediums including CD-ROM and DVD-ROM. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

In this manner, the progress of gas separation can be used by the system to control, for example, the operational state of the pump system. The pump system can include a plurality of micro-pumps where each pump is individual controllable. The micro-pumps can be in the form of an array of micro-pumps of any number. The pumps in the array can be controlled in any manner to affect the gas separation system performance. For example, the active number of pumps can be controller, their frequency of operation, output pressure, and flow can be controlled. This control can be based on progress of gas separation as determined by the sensors and, in this manner, can provide a real-time control with a high degree of process control based on real-time gas separation being used to control the separation process through the pumps and other pneumatic components.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, other devices and methods for determining or sensing gas concentration within a sieve bed can be used. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A gas concentrating system comprising:
   a gas separation system having at least one separation space;
   at least one sensor connected to the separation space and providing at least one output signal indicative of the progress of gas separation;
   at least one pump system associated with the gas separation system, wherein the pump system comprises a plurality of pumps; and
   a controller comprising:
      logic reading the sensor output signal;
      logic controlling at least a first parameter of a first pump of the pump system based on the sensor output signal; and
      logic controlling at least a second parameter of a second pump of the pump system based on the sensor output signal.

2. The system of claim 1 wherein the controller further comprises logic operating the at least one pump system based at least in part on stored parameter settings, wherein the stored parameter settings comprise at least one of a first setting for the first parameter based on the sensor output signal and a second setting for the second parameter based on the sensor output signal.

3. The system of claim 1 wherein the controller further comprises:
   logic determining the progress of a breakthrough zone associated with the progress of gas separation;
   logic determining if the breakthrough zone is near the end of the separation space;
   logic adjusting at least one of a first setting for the first parameter and a second setting for the second parameter based on when the breakthrough zone is near the end of the separation space.

4. The system of claim 1 wherein the logic controlling at least the first parameter of the first pump comprises logic controlling at least an output pressure of the first pump.

5. The system of claim 1 wherein the logic controlling at least the first of the first pump comprises logic controlling at least an output pressure of the first pump and the logic controlling at least the second parameter of the second pump comprises logic controlling at least an output pressure of the second pump.

6. The system of claim 1 wherein the logic controlling at least the first parameter of the first pump comprises logic controlling at least an on and off state of the first pump and the logic controlling at least the second parameter of the second pump comprises logic controlling at least an on and off state of the second pump.

7. The system of claim 1 wherein the at least one sensor comprises a sensor selected from the group consisting of:

oxygen, nitrogen, pressure, temperature, and combinations of the foregoing types of sensors.

8. The system of claim 1 wherein the at least one sensor comprises a plurality of sensors connected to the separation space.

9. The system of claim 1 wherein the at least one sensor comprises a plurality of sensors connected to a plurality of locations within the separation space.

10. The system of claim 1 wherein the controller comprises logic reading a plurality of sensor output signals associated with a plurality of sensors connected to a plurality of locations within the separation space.

11. The system of claim 1 wherein the plurality of pumps comprises pumps having a piezoelectric element.

12. The system of claim 1 wherein at least one of the first parameter and the second parameter comprises a frequency of pump operation.

13. The system of claim 1 wherein the controller further comprises logic increasing or decreasing a number of operating pumps based on the sensor output signal.

14. The system of claim 1 wherein the at least one sensor comprises at least one oxygen sensor monitoring the progress of oxygen separation in the separation space and the at least one parameter of the pump system comprises an output pressure.

15. The system of claim 1 wherein the at least one sensor comprises at least one oxygen sensor monitoring the progress of oxygen separation in the separation space and the at least one parameter of the pump system comprises a frequency of pump operation.

16. The system of claim 1 wherein the at least one sensor comprises at least one oxygen sensor monitoring the progress of oxygen separation in the separation space and the at least one parameter of the pump system comprises the number of active pumps.

17. A gas concentrating system comprising:
a gas separation means having at least one separation space;
at least one sensor means connected to the separation space and providing at least one output signal indicative of the progress of gas separation;
means for providing a positive or negative pressure connected to the gas separation means, wherein the means for providing a positive or negative pressure comprises a plurality of pumping means; and
a means for reading the sensor means output signal and controlling at least a first parameter of a first pumping means and at least a second parameter of a second pumping means based on the sensor means output signal.

18. The system of claim 17 wherein the sensor means comprises means for sensing oxygen within the separation space and the gas concentration system further comprises means for controlling the number of active pumping means.

19. A method of concentrating gas comprising:
sensing the progress of gas separation within a gas separation space and generating at least one output signal;
reading the output signal;
controlling at least one pressure based parameter of a first pump assembly based on the progress of the gas separation within the gas separation space; and
controlling at least one pressure based parameter of a second pump assembly based on the progress of the gas separation within the gas separation space.

20. The method of claim 19 wherein sensing the progress of gas separation comprises sensing the oxygen concentration within the gas separation space and wherein the method further comprises controlling the number of active pump assemblies.

* * * * *